United States Patent [19]
Anzai et al.

[11] 3,908,156
[45] Sept. 23, 1975

[54] INDUCTION MOTOR SPEED CONTROL APPARATUS

[75] Inventors: Nobuo Anzai; Hiroshi Kamaike, both of Inazawa, Japan

[73] Assignee: Mitsubishi Denki Kabushiki Kaisha, Tokyo, Japan

[22] Filed: Dec. 18, 1973

[21] Appl. No.: 425,718

[30] Foreign Application Priority Data
Dec. 19, 1972 Japan.............................. 47-127499

[52] U.S. Cl.............. 318/203 R; 318/212; 318/230
[51] Int. Cl................................................ H02p 1/40
[58] Field of Search........ 318/203 R, 204, 211, 212, 318/227, 230

[56] References Cited
UNITED STATES PATENTS
| | | | |
|---|---|---|---|
| 3,514,682 | 5/1970 | Corey | 318/212 |
| 3,596,156 | 7/1971 | Davey | 318/203 R |
| 3,678,355 | 7/1972 | Bucek et al. | 318/203 R |
| 3,708,734 | 1/1973 | Rowe | 318/212 |

Primary Examiner—G. Z. Rubinson
Attorney, Agent, or Firm—Oblon, Fisher, Spivak, McClelland & Maier

[57] ABSTRACT

An Apparatus for controlling the speed of an induction motor is disclosed wherein a voltage is applied to the motor according to a difference signal between a signal corresponding to the speed of a load and a preset speed command signal, thereby causing the motor to produce a rotating torque corresponding to the difference signal. When the load is driven at a maximum speed, a rated voltage is applied to the motor. The apparatus comprises a device capable of presetting, prior to decelerating the load, a signal necessary to allow the motor to produce a rotating torque corresponding to the load. At the beginning of the load deceleration, a voltage corresponding to the preset signal of the device is applied to the motor.

3 Claims, 6 Drawing Figures

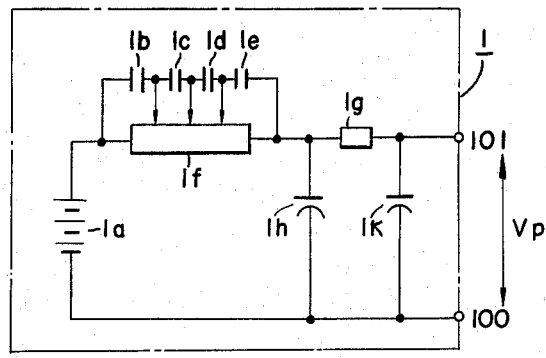
FIG.1
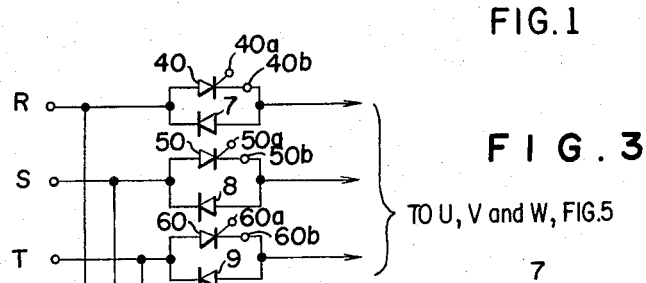
FIG.3
TO U, V and W, FIG.5
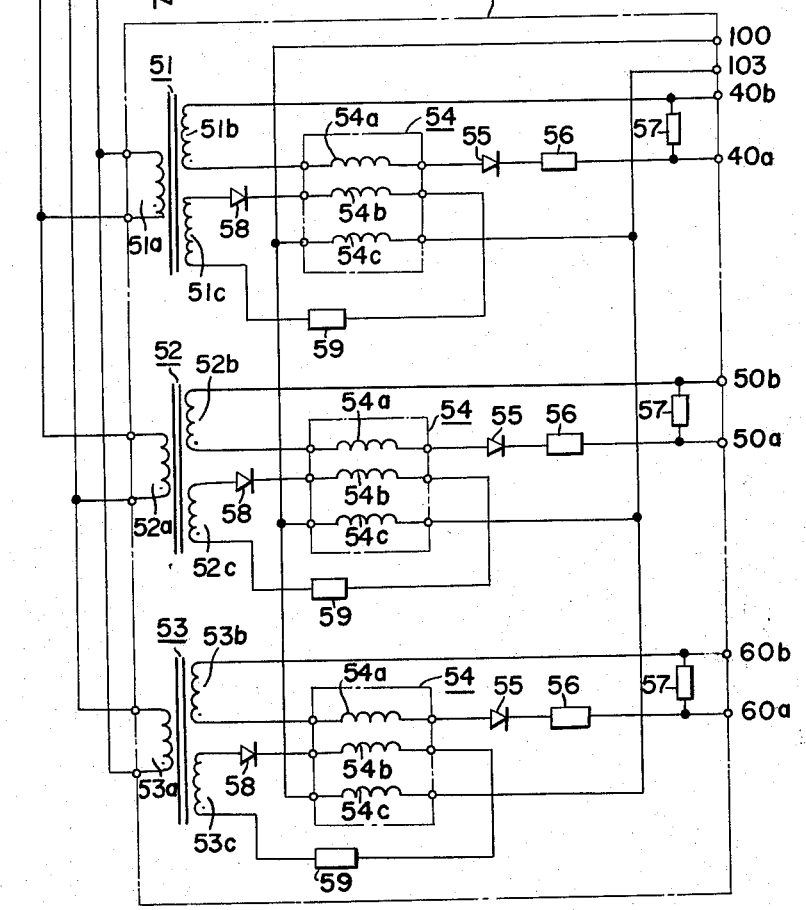

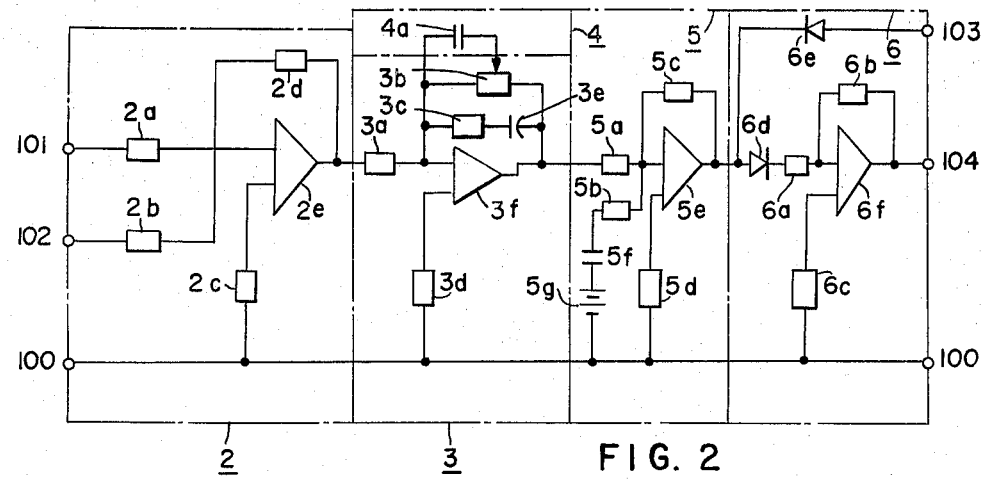
FIG. 2
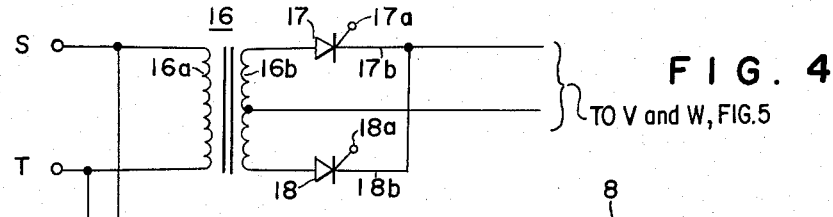
FIG. 4
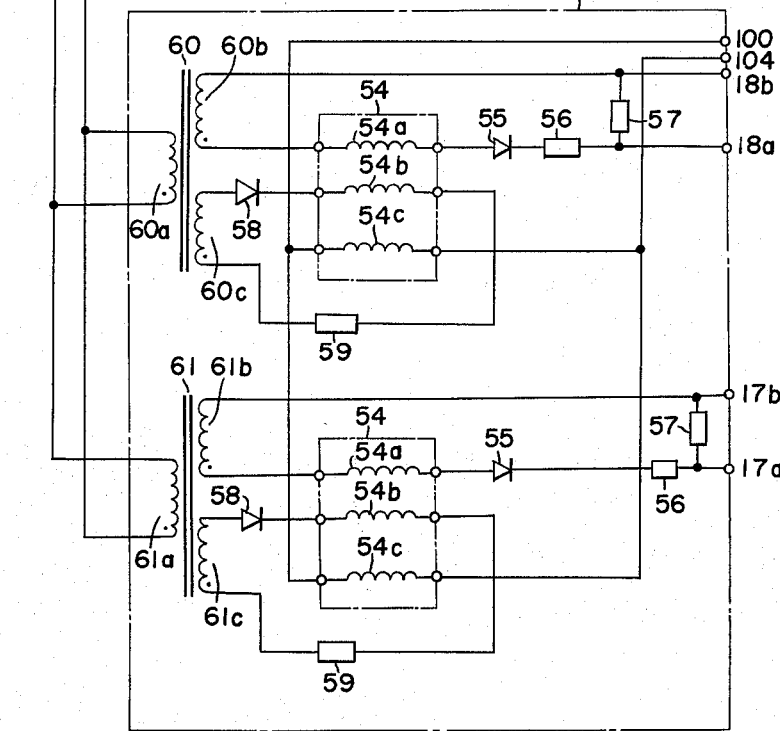

INDUCTION MOTOR SPEED CONTROL APPARATUS

BACKGROUND OF THE INVENTION

1. Field of the Invention

The present invention relates to apparatus for controlling the rotational speed of a load by changing the voltage applied to an induction motor.

2. Description of the Prior Art:

It is known in the art that the voltage applied to an induction motor may be changed by controlling the firing angle of a thyristor connected between the induction motor and its power source whereby the rotational speed of the motor may be controlled. Generally, while the load is being power-run, an AC voltage controlled by the thyristor is applied to the motor. But while the load is being braking-run, a DC voltage controlled by another thyristor is applied to the motor. The foregoing method is utilized for control of the speed, for example, of an elevator cage wherein the cage is under negative feedback control during acceleration and deceleration. For the period after acceleration until the beginning of deceleration, the rated voltage is applied to the motor in order to minimize the heat produced in the motor and to save on power consumption. The speed of the cage for this period will be interpreted hereinafter to be its maximum speed. Under this operating condition, the speed command signal should correspond to the synchronous rotational speed of the motor, and the motor will run at a speed depending upon the characteristic of the speed control system when the cage is being accelerated or decelerated. When the cage is run at its maximum speed, the motor speed depends upon the characteristic of the motor operated at its rated voltage. In this state, the load will automatically be supplied with the torque necessary for its power-run or braking-run, depending upon the rotating torque vs. slip characteristic of the motor.

In practice, it is often the case that when a load is imposed on the motor, the motor speed controlled by the speed control system through a speed command signal, which is generated in correspondence with the synchronous rotational speed of the motor, is not the same as the motor speed derived from the characteristic of the motor driven at its rated voltage. Disadvantageously, then, a discontinuous point develops in the rotating torque of the motor during the process of deceleration of the cage from its maximum speed, resulting in a shock to the cage at the outset of deceleration. Furthermore, such a discontinuity is liable to cause error in the cage stopping position since the degree of deceleration is varied at the beginning of deceleration according to the load condition.

SUMMARY OF THE INVENTION

Accordingly, a general object of the present invention is to provide novel and unique apparatus capable of speed control without producing a discontinuous point in the rotating torque of an induction motor used to drive a load, in the process of control wherein the load decelerates from its speed depending on the motor driven at its rated voltage, thus eliminating any possibilities of causing a shock to the load at the beginning of the deceleration.

The foregoing and other objects are attained in accordance with one aspect of the present invention through the provision of means for assuring a continuous speed change and shock free acceleration and deceleration of a load driven by a speed-controlled induction motor. The voltage output of a speed control circuit is automatically changed to a preset value at the beginning of, for example, deceleration of the load, to maintain the rotating torque of the motor at a value corresponding to its synchronized rotational speed.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which:

FIG. 1 is a circuit diagram of a speed command signal generating device for generating a speed command signal to an elevator according to a preferred embodiment of the present invention;

FIG. 2 is a circuit diagram of a computing device according to a preferred embodiment of the present invention;

FIG. 3 is a circuit diagram according to the present invention which shows thyristors used to control the voltage applied to an induction motor for driving the elevator during a power-run, and further illustrating turn-on control circuits for the thyristors;

FIG. 4 is a circuit diagram according to the present invention of other thyristors used to control the voltage applied to the induction motor for driving the elevator during a braking-run, and further illustrating power transformers and turn-on control circuits for the thyristors;

DETAILED DESCRIPTION OF A PREFERRED EMBODIMENT

Figure 5:
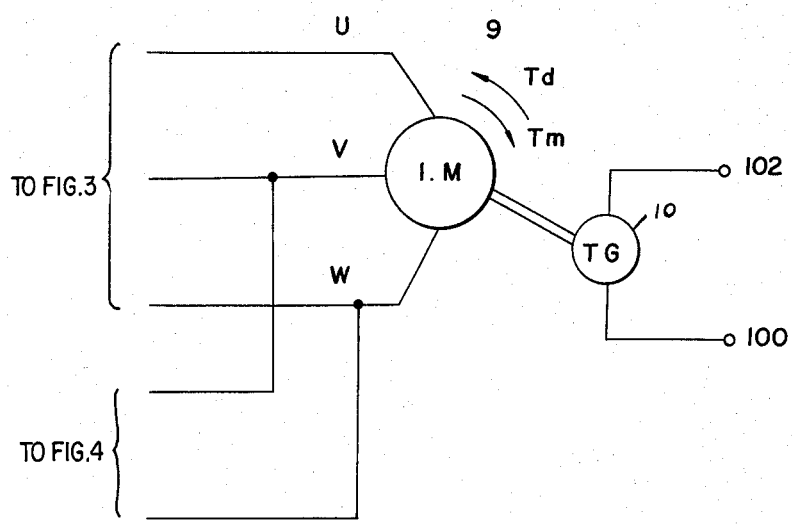
FIG. 5 is a diagram according to the present invention showing an elevator-driving induction motor and a device for transducing the rotational speed of the motor into a voltage.

A preferred embodiment of the present invention as applied to an elevator speed control system will now be described. Referring now to the drawings, wherein like reference numerals designate identical or corresponding parts throughout the several views, and more particularly to FIG. 1 thereof, the reference numeral 1 denotes a device for generating a signal $V_p$ for controlling the speed of an elevator cage (not shown) which comprises a power source 1a, normally open contacts 1b through 1e of accelerating and decelerating relays (not shown), resistors 1f and 1g, and capacitors 1h and 1k. The contacts 1b through 1e assume successive on-states while the cage is accelerating, or successive off-states while decelerating whereby the voltage of power source 1a is divided into various signal steps. These signals are passed through a filter consisting of resistors 1f and 1g and capacitors 1h and 1k to produce a continuous speed command signal $V_p$ across terminals 101 and 100.

Referring now to FIG. 2, reference numeral 2 denotes an adder for adding together the speed command signal $V_p$ appearing across terminals 101 and 100 and a speed signal $V_T$ appearing across terminals 102 and 100, which is opposite in polarity to the signal $V_p$ and is proportional to the speed of the elevator cage as will be explained in more detail hereinafter. Adder 2 comprises resistors 2a through 2d, and an operational amplifier 2e. Reference numeral 3 represents an amplifier having a delay characteristic which comprises resistors 3a through 3d, a capacitor 3e, and an operational amplifier 3f. In this circuit, the static gain depends on the quotient resulting from the division of resistance 3b by resistance 3a, while the frequency characteristic depends on the resistances 3a to 3c and capacitance 3e. The reference numeral 4 denotes an amplification factor changing device comprising a normally open contact 4a of a relay (not shown) which is energized when the cage approaches the deceleration starting point and which is subsequently de-energized when the cage reaches the deceleration starting point. Thus, by changing the resistance of 3b when the contact 4a is in its closed state, the amplification factor of the amplifier 3 may be changed.

Reference numeral 5 indicates a saturation signal generating device comprising resistors 5a through 5d, an operational amplifier 5e, a normally open contact 5f of a relay (not shown) which is energized at the end of acceleration and de-energized at the beginning of deceleration, and a power source 5g. In this circuit, when the contact 5f is open, the output of the amplifier 3 is yielded directly as the output of the saturation signal generating device 5. When the contact 5f is closed, the foregoing gate circuits on the power-running side are saturated irrespective of the output of the amplifier 3.

Still with reference to FIG. 2, reference numeral 6 denotes a distribution circuit comprising resistors 6a through 6c, diodes 6d and 6e and an operational amplifier 6f. This circuit is capable of generating a negative output across terminals 104 and 100 when its input signal is positive, or across terminals 103 and 100 when its input signal is negative. The output across terminals 104 and 100 is supplied to the gate circuit of a braking thyristor, while the output across terminals 103 and 100 is supplied to the gate circuit of the power-running thyristor.

Referring now to FIG. 3, the reference numeral 7 denotes a turn-on control circuit on the side of system where the cage is in its power-run mode. This circuit comprises thyristors 40, 50 and 60, gates 40a, 50a and 60a, cathodes 40b, 50b and 60b, and synchronous transformers 51 through 53 operated for the turn-on circuits of thyristors 40, 50 and 60, respectively. The transformer 51 is for the R-phase thyristor 40 and has its primary winding connected to the R- and T- phase lines. The transformer 52 is the S-phase thyristor 50 and has its primary winding connected to the S- and R-phase lines. The transformer 53 is for the T-phase thyristor 50 and has its primary winding connected to the T- and S-phase lines. The R-, S- and T-phase turn-on circuits are exactly the same in construction and hence only the R-phase turn-on circuit for thyristor 40 need be described.

Reference numeral 54 signifies a magnetic amplifier comprising an output winding 54a, a reset winding 54b, and a control winding 54c. Diodes 55 and 58, resistrs 56, 57 and 59, and output terminals 40a and 40b complete the turn-on circuit for R-phase thyristor 40. The terminal 40a is connected to the gate 40a of thyristor 40, and the terminal 40b is connected to the cathode 40b thereof. The diode 55 is for blocking the gate inverse voltage while the thyristor 40 is being inversely biased. The output voltage of magnetic amplifier 54 is divided through resistors 56 and 57 and applied to the output terminals 40a and 40b of the turn-on circuit. The diode 58, reset winding 54b and resistor 59 constitute a reset circuit which resets the saturation of magnetic amplifier 54 while the thyristor 40 is being inversely biased.

A power-running signal from the distribution amplifier 6 of FIG. 2 is applied across input terminals 103 and 100 and thus a turn-on signal having a phase proportional to the current passing through the control winding 54c is obtained across terminals 40a and 40b to control the thyristor 40.

FIG. 4 shows a circuit similar to the one shown in FIG. 3 which however is utilized to control the voltage to the induction motor during a braking run. Hereinafter only those components different from those shown in FIG. 3 need be described. In FIG. 4, the reference numeral 8 denotes a turn-on control circuit for the braking control mode, comprising control thyristors 17 and 18, gates 17a and 18a, and cathodes 17b and 18b. The reference numeral 60 denotes a synchronous signal transformer for the turn-on circuit for thyristor 18, and 61 denotes a synchronous signal transformer for the turn-on circuit of thyristor 17. A braking signal from the distribution amplifier 6 (of FIG. 2) is applied across input terminals 104 and 100 to cause a turn-on signal having a phase proportional to the input to appear between terminals 18a–18b and terminals 17a–17b to control the thyristors 17 and 18, as in the above-described turn-on circuit 7.

Referring now to FIG. 5, the numeral 9 represents an induction motor for driving the elevator, and the reference letters U, V and W represent power source lines for the motor. Three-phase AC power comes through lines U, V and W to the motor during its power-run, as well as for a full-speed run. For a braking run, DC voltage is applied to lines V and W. The numeral 10 denotes a tachometer generator which is mechanically coupled to the motor 9 and generates across terminals 102 and 100 a voltage $V_T$ which is proportional to the rotational speed of the motor 9, i.e., the speed of the elevator cage.

Figure 6:
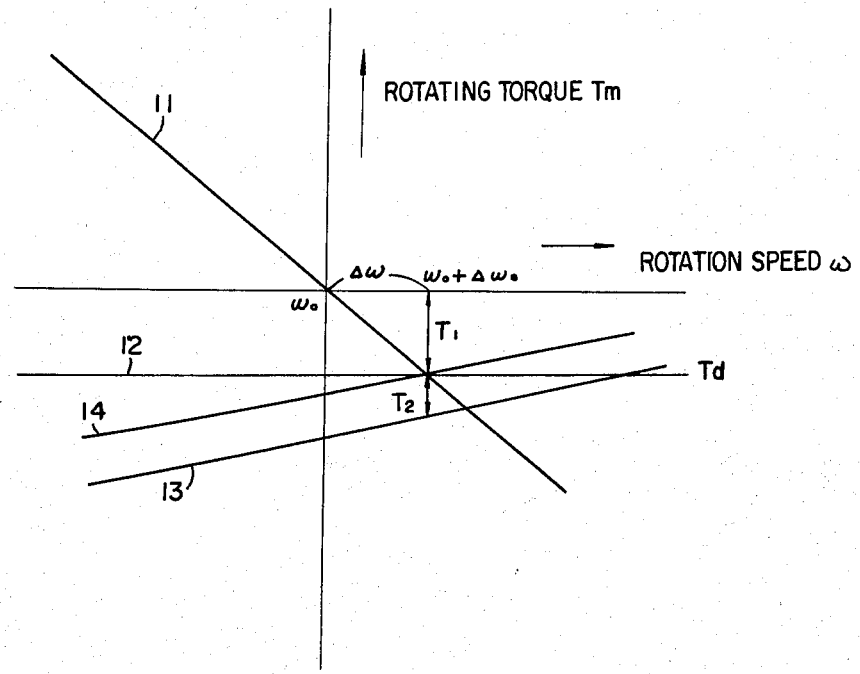
FIG. 6 is a graphic representation showing the rotating torque vs. rotational speed characteristic of the motor according to the principles of the present invention.

In FIG. 6, the numeral 11 indicates a characteristic curve showning the relationship between the motor rotating torque Tm and the rotation speed $\omega$ in the vicinity of the synchronized speed of the motor operated at its rated voltage. A characteristic curve 12 shows the relationship between the rotating torque Td (hereinafter referred to as load torque) imparted to the motor from the load which has a negative polarity (i.e., the load when the cage descends in its full load state causes the motor to be driven at a speed higher than its synchronized speed), and the rotation speed $\omega$.

In operation, assume that the elevator cage is in its full load state. When the motor is actuated for downward rotation, the adder 2 compares the speed signal $V_t$ from the tachometer generator 10, with the speed command signal $V_p$. The resultant difference signal is supplied to the amplifier 3. At this moment the amplification factor changing device 4 generates no signal and hence the difference signal is amplified with a normal amplification factor and is applied to the turn-on control circuit 7 on the power-run side or to the turn-on control circuit 8 on the braking-run side. The thyristor gate is controlled by this signal, and the voltage applied to the motor is progressively increased, thus accelerating the motor. Simultaneously, the cage is accelerated following the speed command signal $V_p$. When the acceleration of the cage ends, a rated voltage is applied to the motor through the saturation signal generating device 5. In this state the motor runs at a speed $\omega_o + \Delta\omega$, (higher by $\Delta\omega$ than its synchronized speed $\omega_o$) at which a braking torque equal to the load torque Td is produced. Thus, the cage will descend at a constant speed.. At this stage of operation the speed command signal $V_p$ is set to a value corresponding to the synchronized speed $\omega_o$.

When the cage begins decelerating, the circuit 5 through which a rated voltage is applied to the motor is disconnected and the speed of the cage is under the control of negative feedback. At this instant, the initial value of the speed control system is not always sufficient to cause the motor to deliver a rotating torque to meet the load torque. More specifically, at the moment the circuit through which a rated voltage is applied to the motor is disconnected, a signal of the value $(V_p - V_t) \times K_1$ is supplied to the turn-on control circuit 8 on the braking-run side, wherein $V_t$ = the speed signal corresponding to the rotation speed $\omega_o + \Delta\omega$ of the motor; $V_p$ = the speed command signal corresponding to $\omega_o$; and $K_1$ = the amplification factor of the circuit from terminals 101 to 104. If a voltage is applied to the motor according to this signal, the motor will deliver a braking torque as shown by the curve 13 of FIG. 6. Usually, this braking torque does not correspond to the load torque Td at the rotation speed $\omega_o + \Delta\omega$. However, as is well-known, the braking torque is nearly proportional to the load torque. To illustrate the present invention more specifically, the speed control will now be described when the braking torque is larger than the load torque.

As seen in FIG. 6, the motor produces a braking torque, $T_1 + T_2$, at the rotation speed $\omega_o + \Delta\omega$. Thus, if the circuit 5 through which a rated voltage is applied to the motor at the beginning of deceleration is disconnected, the braking torque $T_2$ becomes additionally exerted upon the load, causing a sharp shock to the cage, as is often encountered in the prior art as described hereinabove.

According to the present invention, however, the shock problem may be eliminated in the following manner. When the cage approaches the deceleration starting point, the amplification factor changing device 4 (of FIG. 2) generates a signal. This signal serves to change the amplification factor of the circuit from terminals 101 to 104 to $K_2$, which is smaller than $K_1$. Then the capacitor 3e is charged so that the input to the turn-on control circuit 8 on the braking-run side becomes $(V_p - V_t) \times K_2$ at the moment the contact 5f of the saturation signal generating device 5 is opened. When a voltage is applied to the motor by this signal, the motor produces a braking torque as indicated by the curve 14 of FIG. 6. The value of this torque is set to be $T_1$ at the rotation speed $\omega_o + \Delta\omega$. Therefore, the signal $(V_p - V_t) \times K_2$ is supplied to the turn-on circuit 8 on the braking run side at the beginning of deceleration after the circuit 5 through which a rated voltage is applied to the motor has been disconnected. Accordingly, the rotating torque of the motor becomes equal to $T_1$, thus assuring a continuous speed change and shock-free deceleration of the cage. According to the invention, the rotating torque of the motor will not change abruptly from $T_1$ to $T_1 + T_2$ since the amplifier 3 has a fairly large delay characteristic although the output of the amplification factor changing device 4 ceases at the moment that deceleration starts. Therefore, any possibilities of causing shock to the cage are eliminated. Following the start of deceleration, the motor delivers a braking torque corresponding to $(V_p - V_t)$ to progressively decelerate the cage.

As described above, the rotational speed of the motor driven while the cage is being run at its maximum speed depends on the characteristics (i.e., the rotating torque vs. slip characteristic) of the motor. Similarly, the rotational speed of the motor driven while the cage is accelerating or decelerating depends on the characteristics of the speed control system operated in a closed loop. Generally, however, it is often the case that when a load is imposed on the motor, the motor speed, controlled by the speed control system through a speed command signal, which is generated corresponding to the synchronous rotational speed of the motor, does not correspond to the motor speed which depends on the characteristics of the motor driven at its rated voltage. This has created a discontinuous point in the rotating torque of the motor. The present invention has solved this problem by smoothly changing the rotating torque of the motor as described above.

An example of operation according to the present invention has been described wherein the cage descends in its full load state and is braked by controlling the rotating torque of the motor. The present invention is obviously not limited to this example but is also applicable to speed control wherein the cage ascends by driving the motor with the load in its power-run mode. In the foregoing embodiment, the rotating torque at the rotational speed $\omega_o + \Delta\omega$ as in FIG. 6 (curve 12) is larger than $T_1$. Alternatively, the rotating torque may be smaller than $T_1$ in view of the principles of the present invention.

According to the present invention, as has been described in detail above, the signal necessary to allow the motor to produce a rotating torque corresponding to the load is present at the stage of load deceleration, and a voltage is applied to the motor by the present signal upon deceleration whereby the torque may be continuously changed and smooth deceleration is realized without causing shock to the cage.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. Apparatus for controlling the speed of an induction motor comprising:
   means for generating a preset command signal corresponding to the desired speed of the motor;
   means for generating a first signal corresponding to the speed of the load of the motor;
   means for generating a difference signal corresponding to the difference between the first signal and the preset command signal;
   means for applying the difference signal to the motor to cause the motor to produce a rotating torque corresponding to the difference signal;

means for applying a rated voltage to the motor when the load is driven at its maximum speed;

means for presetting, prior to the deceleration of the load, a second signal corresponding to the load torque of the motor;

means for applying the second signal to the motor at the beginning of the deceleration of the load to prevent a discontinuity in the rotating torque of the motor during the time the motor is decelerated from its maximum speed.

2. Apparatus for controlling the speed of an induction motor in accordance with claim 1 further comprising:

means for disconnecting the means for applying a rated voltage to the motor at the beginning of the deceleration of the load.

3. Apparatus for controlling the speed of an induction motor in accordance with claim 2 wherein the means for presetting the second signal comprises amplification factor changing device.

* * * * *